May 5, 1959 W. SICHAK 2,885,542

DIVERSITY COMMUNICATION RECEIVING SYSTEM

Filed Sept. 16, 1955

INVENTOR
WILLIAM SICHAK
BY Ernest Zanwick
ATTORNEY

United States Patent Office 2,885,542

Patented May 5, 1959

2,885,542

DIVERSITY COMMUNICATION RECEIVING SYSTEM

William Sichak, Nutley, N.J., assignor to International Telephone and Telegraph Corporation, Nutley, N.J., a corporation of Maryland Application September 16, 1955, Serial No. 534,660

5 Claims. (Cl. 250—13)

This invention relates to spaced diversity communication systems and, more particularly, to a spaced diversity radio signalling system for two-way communication using only three antennas.

The usual spaced diversity system used in the reception of modulated radio waves normally employs an arrangement usually requiring separate receivers and separate antennas in order to achieve a system in which the fading is minimized by the reception of the incoming signal in two or more locations so that the signal fades more or less at random and then combining the respective outputs of the separate receivers so that the resultant signal fades only when the signal detected in each receiver fades completely and simultaneously. Such an arrangement requiring separate antennas becomes quite expensive especially where the antennas are directional, since the expense of each antenna system is quite large, and to provide spaced diversity reception in each direction in accordance with the prior art systems normally required the use of at least four antennas.

In accordance with the present invention, a spaced diversity two-way communication system is provided in which only three antennas are required.

This invention makes use of a dual polarization antenna, such as a horn, which is capable of operation with signals having distinct modes of operation such as orthogonally-related polarization. In one embodiment of my invention, one terminal of the spaced diversity two-way radio communication system utilizes a single antenna for receiving both horizontal and vertical polarized signals while the other terminal station utilizes a pair of antennas, spaced apart for diversity operation, one of which at least is capable of receiving or transmitting signals having orthogonally-related planes of polarization.

To achieve the spaced diversity two-way communication system in accordance with the principles of this invention, it is merely necessary to provide at one terminal station a pair of receivers each adapted to detect one of two orthogonally-related polarized signals and a transmitter adapted to radiate signals of a given polarization. It is necessary to provide at the other terminal station a pair of spaced antennas, the first adapted to receive signals at said given polarization and the other antenna, spaced from said first antenna, adapted to operate on both signals having orthogonally-related polarizations. A transmitter is provided at the second terminal station which transmits signals from each of the pair of antennas but in orthogonally-related polarization modes, and receivers are provided to detect the signals which were transmitted by the first terminal station and the output of these receivers are combined at said given plane of polarization from each of said antennas.

Figure 1:
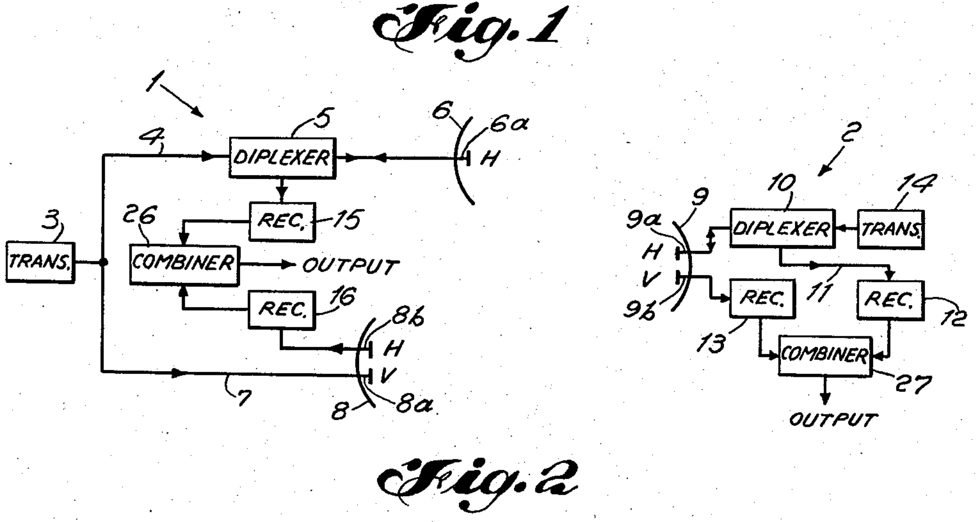
Figure 2:
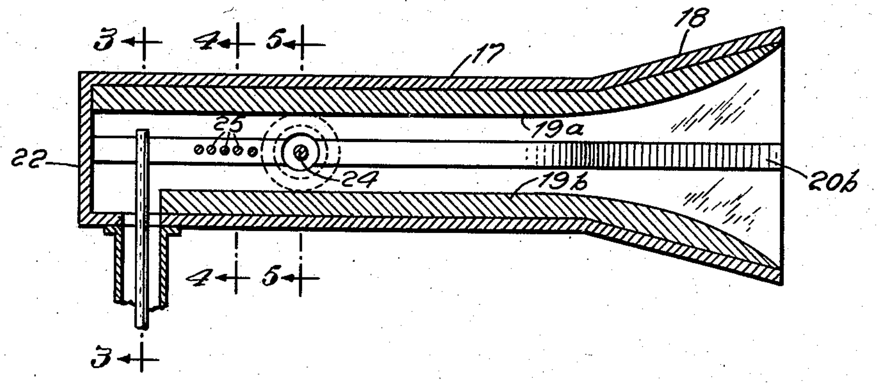
Figure 3:
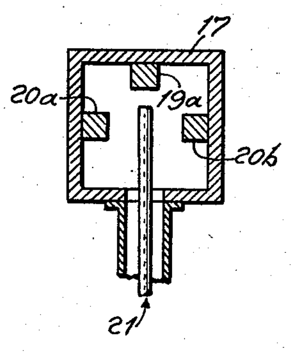
Figure 4:
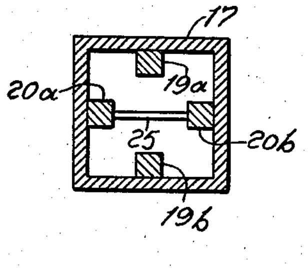
Figure 5:
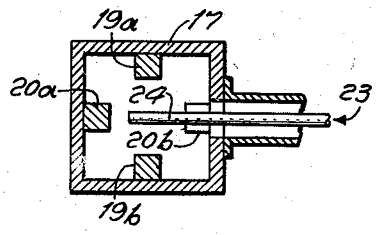

The above-mentioned and other features and objects of this invention will become more apparent by reference to the following description taken in conjunction with the accompanying drawings, in which:

Fig. 1 is a schematic drawing in block form of one embodiment of a spaced diversity two-way radio communication system in accordance with the principles of my invention;

Fig. 2 is a cross-sectional view in elevation of an antenna horn suitable for use in the diversity system of my invention; and Figs. 3, 4 and 5 are cross-sectional views taken along the lines 3—3, 4—4 and 5—5, respectively, of Fig. 2.

Referring to Fig. 1 of the invention, a three-antenna two-way communication spaced diversity system in accordance with the principles of my invention is therein shown to comprise a first terminal station generally indicated at 1 and a second terminal station generally indicated at 2. Terminal station 1 comprises a transmitter 3 whose output is coupled over line 4 and through diplexer 5 to an antenna 6. In order to transmit from terminal station 1 to terminal station 2, the antenna 6 radiates the output of the transmitter 3 as horizontally-polarized signals indicated by the letter "H" associated with the antenna probe element *6a*.

The output of the transmitter 3 is coupled over line 7 to a second antenna 8, spaced from the antenna 6 by a distance sufficiently great, in terms of wavelength, to obtain the diversity effect. The energy coupled from transmitter 3 over line 7 to the antenna 8 is transmitted in a vertical plane of polarization as indicated by the letter "V" associated with the probe *8a* of the antenna 8. The signals radiated from the spaced antennas 6 and 8 in the horizontal and vertical planes of polarization, respectively, are detected at the second terminal station by an antenna 9 capable of receiving signals in the orthogonally-related horizontal and vertical planes of polarization as indicated by the letters "H" and "V" associated with the probes *9a* and *9b* of antenna system 9. The horizontally-polarized signals are coupled through diplexer 10 and over line 11 to a receiver 12. The vertically-polarized signals are coupled from the probe *9b* of the antenna system 9 to a receiver 13. The outputs of receivers 12 and 13 are combined in circuit 27 to form the output of the diversity communication system.

To accomplish transmission in the opposite or right-to-left direction from terminal station 2 to terminal station 1, the output of the transmitter 14 associated with terminal 2 is coupled through the diplexer 10 to the probe *9a* of the antenna system 9 and radiated in a horizontally-polarized direction by element *9a*. The horizontally-polarized signals emitted by antenna 9 are detected at antenna system 6 by probe *6a* and at antenna system 8 by probe *8b*. The output of antenna 6 is coupled through diplexer 5 to receiver 15, and the output of antenna system 8 is coupled to receiver 16. The outputs of receivers 15 and 16 are combined in circuit 26 to form the output of the diversity system.

In transmission from terminal 2 to terminal 1, the two receiving antennas 6 and 8 are spaced sufficiently far apart so that the proper diversity action is obtained during reception and, by reciprocity, diversity action is also obtained when the antennas 6 and 8 are utilized to transmit signals in the opposite direction provided the transmitted signal polarization is not changed by the transmission medium. My experimentation with orthogonally-polarized signals has shown that the received polarization is substantially unchanged from the polarization transmitted for orthogonally-related polarizations and that the decoupling between signals of different polarizations is at least 20 db.

For the proper operation of the three-antenna dual-polarization diversity system, in accordance with the principles of my invention, it is necessary to utilize a single antenna for two orthogonally-polarized signals. One example of a dual-polarized antenna which can be utilized for signals over a large bandwidth is shown in Fig. 2 to comprise a rectangular waveguide 17 whose radiation portion 18 is flared. In order to provide for broad bandwidth operation, vertical ridges *19a* and *19b* and horizontal ridges 20a and 20b are provided. Referring to Figs. 3, 4 and 5, it is seen that the waveguide 17 is rectangular in cross section. To radiate the vertically-polarized signals, the input is coupled over coaxial input line 21 to propagate vertical polarized waves in the waveguide 17 which are radiated from the flared portion 18. The inner conductor or probe portion of input connection 21 is located approximately a quarter wavelength in front of the shorted portion of the vertical ridges 19a and 19b as shown at 22. To radiate horizontally-polarized signals, input signals are coupled to the coaxial input 23 which is terminated in a probe 24 located substantially a quarter wavelength in front of the shorting wires 25 which are utilized to short the horizontal ridges 20a and 20b.

While I have described above the principles of my invention in connection with specific apparatus, it is to be clearly understood that this description is made only by way of example and not as a limitation to the scope of my invention as set forth in the objects thereof and in the accompanying claims.

I claim:

1. A diversity radio signalling system for reducing fading effects comprising a first station including a first radio signal receiving means for receiving signals propagated according to a first mode of propagation, a second radio signal receiving means for receiving signals propagated according to said first mode of propagation, said first and second receiving means being disposed respectively at first and second locations spaced from each other, and first transmitting apparatus including means for radiating signals according to said first mode of propagation from said first location, and means for radiating signals according to a second mode of propagation from said second location; and a second station spaced from said first station including a third radio signal receiving means for receiving signals propagated according to said first mode of propagation, a fourth radio signal receiving means for receiving signals propagated according to said second mode of propagation, said third and fourth receiving means being disposed at a same location, and second transmitting apparatus including means for radiating signals according to said first mode of propagation from said same location.

2. A diversity radio signalling system for reducing fading effects comprising a first station including a first antenna to receive radio signals propagated according to a first mode of propagation, a second antenna to receive radio signals propagated according to said first mode of propagation, said first and second antennas being disposed in spaced relation to each other, and transmitting means including means to transmit radio signals according to said first mode of propagation from said first antenna and means to transmit radio signals according to a second mode of propagation from said second antenna; and a second station including a third antenna to receive radio signals propagated according to both said first and second modes of propagation and transmitting means including means to transmit radio signals from said third antenna according to said first mode of propagation.

3. A diversity radio signalling system for reducing fading effects comprising a first station including a first antenna having a first transducing means oriented to receive radio signals propagated according to a first mode of propagation, a first transmitting means, means coupling said first transmitting means to said first transducing means to transmit radio signals according to said first mode of propagation, a second antenna having a second transducing means oriented parallel to said first transducing means to receive radio signals propagated according to said first mode of propagation and a third transducing means oriented at an angle with respect to said second transducing means, said first and second antennas being disposed in spaced relation to each other, and means coupling said first transmitting means to said third transducing means to transmit radio signals according to a second mode of propagation; and a second station including a third antenna having a fourth transducing means oriented parallel to said first transducing means to receive radio signals according to said first mode of propagation and a fifth transducing means oriented parallel to said third transducing means to receive radio signals according to said second mode of propagation, a second transmitting means, and means to couple said second transmitting means to said fourth transducing means to transmit radio signals according to said first mode of propagation.

4. A diversity radio signalling system for reducing fading effects comprising a first station including a first antenna having transducing means for radio signals propagated according to a first mode of propagation, a second antenna having a first transducing means for radio signals propagated according to said first mode of propagation and a second transducing means for radio signals propagated according to a second mode of propagation, said first and second antennas being disposed in spaced relation with respect to each other, a first receiver, a second receiver, a first transmitter, means coupling said first transmitter to the second transducing means of said second antenna, means coupling said second receiver to the first transducing means of said second antenna, first diplexer means to couple said first receiver and said first transmitter to the transducing means of said first antenna, and means to combine the outputs of said first and second receivers; and a second station including a third antenna having first transducing means for radio signals propagated according to said first mode of propagation and second transducing means for radio signals propagated according to said second mode of propagation, a third receiver, a fourth receiver, a second transmitter, second diplexer means to couple said third receiver and said second transmitter to the first transducing means of said third antenna, means to couple said fourth receiver to the second transducing means of said third antenna, and means coupled to the outputs of said third and fourth receivers to combine the signals detected thereby.

5. A diversity radio signalling system for reducing fading effects comprising a first terminal station including a first antenna, a first means disposed in said first antenna to radiate signals having a first mode of propagation, a second antenna spaced from said first antenna a distance equal to at least one wavelength at the operating frequency of said system, a second means disposed in said second antenna to radiate signals having a second mode of propagation, a signal transmitter, and means coupling said transmitter to said first and second means for excitation by the signals of said transmitter; and a second terminal station including a third antenna, a first means disposed in said third antenna to receive signals of said first mode of propagation, a second means disposed in said third antenna to receive signals of said second mode of propagation, a first receiver coupled to said first means in said third antenna to detect signals having said first mode of propagation, a second receiver coupled to said second means in said third antenna to detect signals having said second mode of propagation and means to combine the outputs from said first and second receivers.

References Cited in the file of this patent

UNITED STATES PATENTS

| | | |
|---|---|---|
| 1,805,591 | Ohl | May 19, 1931 |
| 1,853,021 | Alexanderson | Apr. 12, 1932 |
| 2,186,422 | Matthews | Jan. 9, 1940 |
| 2,248,215 | Budenbom | July 8, 1941 |
| 2,272,839 | Hammond | Feb. 10, 1942 |
| 2,311,435 | Gerhard | Feb. 16, 1943 |
| 2,490,061 | Jensen et al. | Dec. 6, 1949 |
| 2,531,951 | Shamos et al. | Nov. 28, 1950 |
| 2,567,197 | Fox | Sept. 11, 1951 |
| 2,610,292 | Bond et al. | Sept. 9, 1952 |